(12) United States Patent
Cho

(10) Patent No.: US 10,847,334 B2
(45) Date of Patent: Nov. 24, 2020

(54) APPARATUS AND METHOD FOR CONTROLLING CURRENT

(71) Applicant: LSIS CO., LTD., Anyang-si (KR)

(72) Inventor: Byunggeuk Cho, Anyang (KR)

(73) Assignee: LSIS CO., LTD., Anyang-si (KR)

( * ) Notice: Subject to any disclaimer, the term of this patent is extended or adjusted under 35 U.S.C. 154(b) by 425 days.

(21) Appl. No.: 15/861,307

(22) Filed: Jan. 3, 2018

(65) Prior Publication Data

US 2018/0286619 A1    Oct. 4, 2018

(30) Foreign Application Priority Data

Mar. 28, 2017    (KR) .................. 10-2017-0038962

(51) Int. Cl.
*H01H 71/24*    (2006.01)
*G05F 1/565*    (2006.01)
*H02M 7/48*    (2007.01)

(52) U.S. Cl.
CPC ......... *H01H 71/2472* (2013.01); *G05F 1/565* (2013.01); *H02M 7/48* (2013.01)

(58) Field of Classification Search
CPC ......... H02M 2001/0009; H02M 1/126; H02M 7/53873; H02P 23/14; H02P 27/06
See application file for complete search history.

(56) References Cited

U.S. PATENT DOCUMENTS

| | | | |
|---|---|---|---|
| 7,026,800 B2 | 4/2006 | Liu et al. | |
| 9,319,011 B2 | 4/2016 | Kinyua et al. | |
| 2009/0058303 A1* | 3/2009 | Kadrnoschka | F03H 1/0018 315/111.01 |
| 2012/0194113 A1* | 8/2012 | Lee | H02P 6/18 318/400.33 |
| 2015/0028793 A1* | 1/2015 | Yoshimoto | H02P 21/04 318/812 |
| 2016/0373025 A1 | 12/2016 | Mascioli et al. | |
| 2017/0025943 A1* | 1/2017 | Eren | H02M 7/53873 |

FOREIGN PATENT DOCUMENTS

| | | |
|---|---|---|
| CN | 102075108 A | 5/2011 |
| CN | 102185509 A | 9/2011 |
| CN | 104037800 A | 9/2014 |
| CN | 105610335 A | 5/2016 |
| CN | 106230296 A | 12/2016 |

(Continued)

OTHER PUBLICATIONS

Ghoshal Anirban, et al.; "A controller design method for 3 phase 4 wire grid connected VSI with LCL filter"; Department of Electrical Engineering, Indian Institute of Science; Bangalore, India; vol. 40., No. 5; Sep. 7, 2015; (19 pages).

(Continued)

*Primary Examiner* — Zoheb S Imtiaz
(74) *Attorney, Agent, or Firm* — K&L Gates LLP

(57) ABSTRACT

The present invention relates to an apparatus for controlling an output current provided from an inverter to a plant according to a current command. The apparatus includes a calculation unit to decide a current error between the current command and the output current, output an output voltage by applying a gain including a control frequency of the current command to the current error, and output an output current from the output voltage.

9 Claims, 6 Drawing Sheets

(56) References Cited

FOREIGN PATENT DOCUMENTS

| | | |
|---|---|---|
| JP | H0720906 A | 1/1995 |
| JP | 2005269818 A | 9/2005 |
| JP | 2006031654 A | 2/2006 |
| JP | 2006129681 A | 5/2006 |
| KR | 20130088440 A | 8/2013 |
| KR | 101566387 B1 | 11/2015 |
| WO | 2008103946 A2 | 8/2008 |

OTHER PUBLICATIONS

European Search Report for related European Application No. 17203049.6; report dated Jun. 5, 2018; (7 pages).
Japanese Notice of Allowance for related Japanese Application No. 2017-245171; action dated Sep. 11, 2018; (2 pages).
Chinese Office Action for related Chinese Application No. 201711338128.9; action dated Jul. 29, 2019; (5 pages).

\* cited by examiner

APPARATUS AND METHOD FOR CONTROLLING CURRENT

CROSS-REFERENCE TO RELATED APPLICATION

Pursuant to 35 USC § 119 (a), this application claims the benefit of an earlier filing date and priority to Korean Application No. 10-2017-0038962, filed on Mar. 28, 2017, the contents of which are incorporated by reference herein in its entirety.

BACKGROUND OF THE INVENTION

1. Field of the Invention

Various embodiments relate to an apparatus and method for controlling current, and more particularly a proportional resonance (PR) control apparatus and an operating method thereof.

2. Description of the Related Art

Generally, a proportional and resonant (PR) control apparatus for controlling current is implemented on a stationary coordinate system of a single-phase or three-phase system to control alternating current, and is widely used in industry.

Since the PR control apparatus theoretically has an infinite gain for a specific frequency, it has similar characteristics to those of a primary low-pass filter, in which a transfer function of a closed loop control system is a cut-off frequency. Therefore, if the cut-off frequency is designed to be sufficiently larger than a frequency of an AC signal to be controlled, a steady-state error is eliminated.

However, the cut-off frequency of the closed loop control system cannot be infinitely increased because it is limited by a switching frequency of an inverter. Therefore, in an inverter with a low switching frequency, the steady-state error is caused with respect to a high frequency component upon a harmonic current compensation.

Therefore, since the PR control apparatus is typically configured to compensate only for limited harmonic current, components over a specific frequency is uncontrollable.

SUMMARY OF THE INVENTION

Various embodiments may provide an apparatus and method for controlling an output current provided from an inverter to a plant according to a current command.

According to various embodiments, the apparatus may include a comparison unit to decide a current error between the current command and the output current, a transfer function application unit to output an output voltage by applying a gain including a control frequency of the current command to the current error, and a calculation unit to output the output current from the output voltage.

According to various embodiments, the method may include deciding a current error between the current command and the output current, outputting an output voltage by applying a gain including a control frequency of the current command to the current error, and outputting the output current from the output voltage.

According to various embodiments, since the apparatus is implemented as a secondary band-pass filter, an effect that a steady-state error is eliminated at the control frequency regardless of a control variable can be obtained. Therefore, an inverter system having a low switching frequency can effectively achieve a harmonic current control performance. Also, the inverter system can have an improved harmonic control performance such as harmonic compensation or dead time compensation.

DETAILED DESCRIPTION OF THE INVENTION

In order to fully understand the structure and effects of the present invention, the preferred embodiments of the present invention will be described with reference to the accompanying drawings. However, the present invention is not limited to the embodiments described below, but may be implemented in various forms modifications. The embodiments disclosed herein are merely illustrative to help understanding the present invention and fully inform of the scope of the present invention to those skilled in the art that the present invention pertains. In the accompanying drawings, constituent elements are enlarged in size for the convenience of explanation, and the proportions of the constituent elements may be exaggerated or reduced.

It will be understood that when an element is referred to as being "on" or "in contact with" another element, the element is directly in contact with or is connected to the another element, or there are no intervening elements therebetween. It will be understood that when an element is referred to as being "directly on" or "directly in contact with" another element, there are no intervening elements present. Other expressions that describe the relationship among elements, for example, 'between' and 'directly between' may be similarly interpreted.

It will be understood that although the terms first, second, etc. may be used herein to describe various elements, these elements should not be limited by these terms. These terms are generally only used to distinguish one element from another. For example, 'first component' may be referred to as 'second component', and similarly, the 'second component' may also be referred to as the 'first component', without departing from the scope of the present invention.

A singular representation may include a plural representation unless it represents a definitely different meaning from the context. Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

The terms used in the embodiments of the present invention may be construed as commonly known to those skilled in the art unless otherwise defined. Hereinafter, the present invention will be described in detail according to the preferred embodiments of the present invention with reference to the accompanying drawings.

Figure 1:
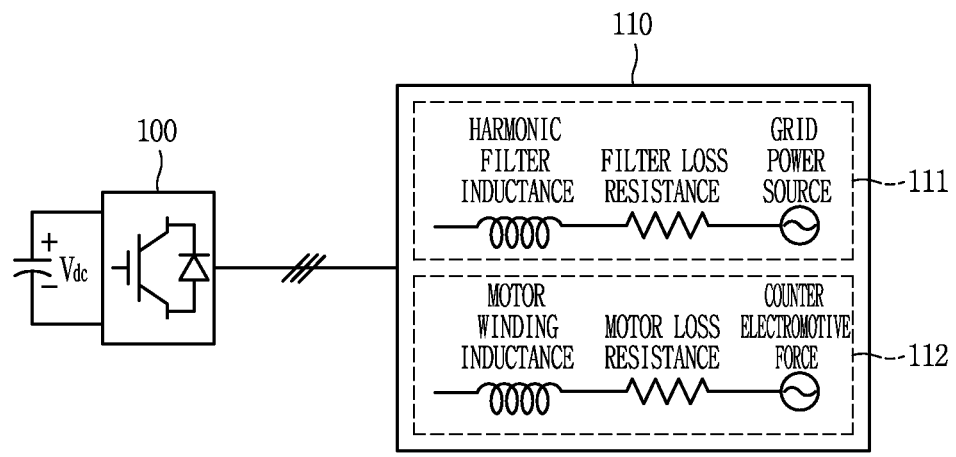
FIG. 1 is a block diagram of a typical inverter system.

FIG. 1 is a block diagram of a typical inverter system.

Referring to FIG. 1, an inverter system includes an inverter 100 and a plant 110. In the inverter system, a current is generated in the inverter 100 and flows into the plant 110. The inverter 100 is configured as a power semiconductor switch such as an insulated gate bipolar mode transistor (IGBT) or a metal oxide silicon field effect transistor (MOSFET). The plant 110 may be configured as a grid-connected load 111 or a motor load 112.

Both the grid-connected load 111 and the motor load 112 may be electrically configured in a form including an inductor component, a loss resistance component, and a voltage. That is, the grid-connected load 111 is electrically configured in the form including harmonic filter inductance, filter loss resistance, and a grid power source, and the motor load 112 is configured in the form including motor winding inductance, motor loss resistance, and counter electromotive force.

Figure 2:
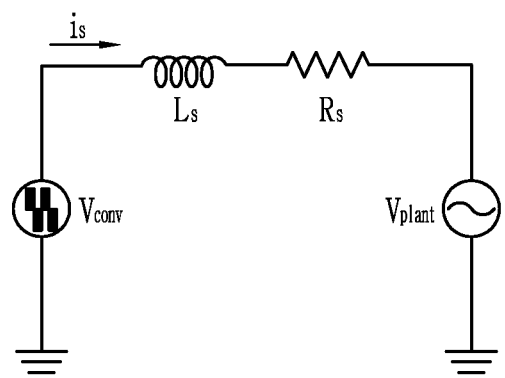
FIG. 2 is an electric single-phase equivalent circuit diagram of FIG. 1.

FIG. 2 is an electric single-phase equivalent circuit diagram of FIG. 1.

Referring to FIG. 2, as the inverter 100 generates a voltage $V_{conv}$ an output current $i_s$ flows on the plant 110. The inductance component $L_s$, the loss resistance component $R_s$, and the voltage component $V_{plant}$ configure an equivalent circuit of the plant 110.

Figure 3:
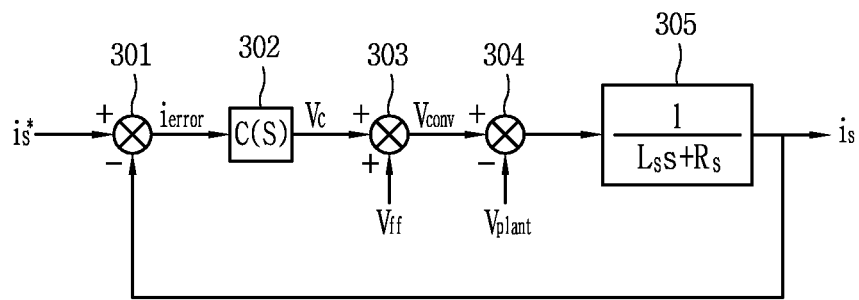
FIGS. 3 and 4 are block diagrams of a current control apparatus in accordance with various embodiments.
Figure 4:
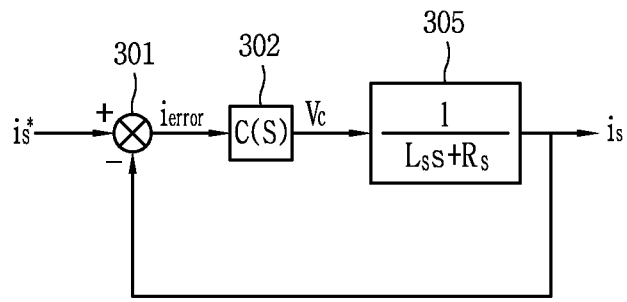

FIGS. 3 and 4 are block diagrams of a current control apparatus according to various embodiments.

Referring to FIG. 3, a current control apparatus includes a first comparison unit 301, a transfer function application unit 302, an adding unit 303, a second comparison unit 304, and a calculation unit 305.

The first comparison unit 301 outputs a current error $i_{error}$ between a current command $i_s^*$ to be controlled and an output current $i_s$ actually applied to the plant 110. The transfer function application unit 302 outputs an output voltage $V_c$ by applying a first transfer function of a feedback component to the current error $i_{error}$. The adding unit 303 outputs an inverter voltage $V_{conv}$ applied to the plant 110 by adding a feed-forward component $V_{ff}$ to the output voltage $V_c$. At this time, the feed-forward component $V_{ff}$ is obtained by subtracting a measurement value from a voltage of a load. However, in the motor load 112, estimation other than the measurement is used. The second comparison unit 304 outputs a voltage error between the inverter voltage $V_{conv}$ and a plant voltage $V_{plant}$. The calculation unit 305 outputs an output current $i_s$ applied to the plant 110 by applying a second transfer function, in which the inductance component $L_s$ and the loss resistance component $R_s$ of the plant 110 are expressed as a frequency domain, to an output of the second comparison unit 304.

In FIG. 3, if the feed-forward component $V_{ff}$ is decided to be the same as the voltage component $V_{plant}$ of the plant 110, FIG. 3 may be equated to FIG. 4. That is, FIG. 3 shows a form without the feed-forward component $V_{ff}$ and the voltage component $V_{plant}$ of the plant 110. A relation of the current of the plant 110 with respect to the current command on the basis of the form, the following [Equation 1] is obtained.

$$\frac{i(s)}{i^*(s)} = \frac{C(s)}{C(s) + L_s s + R_s} \quad \text{[Equation 1]}$$

Figure 5:
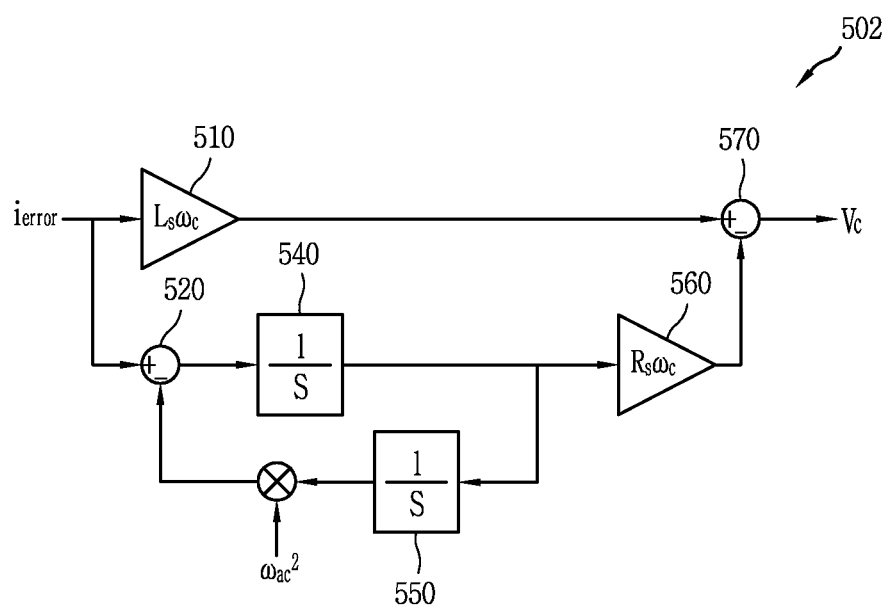
FIG. 5 is a detailed configuration view of a transfer function application unit according to a first embodiment.

FIG. 5 is a detailed configuration view of a transfer function application unit according to a first embodiment.

Referring to FIG. 5, a current control apparatus according to a first embodiment includes a transfer function application unit 502. At this time, the current control apparatus operates similar to a primary low-pass filter having a cut-off frequency $\omega_c$. At this time, the transfer function application unit 502 applies a gain including the cut-off frequency $\omega_c$ to a current error $i_{error}$. The transfer function application unit 502 includes a first applying portion 510, a first calculating portion 520, a second calculating portion 530, a first integrating portion 540, a second integrating portion 550, a second calculating portion 560 and a third calculating portion 570.

The first applying portion 510 applies a first gain $L_s\omega_c$ to a current error $i_{error}$. At this time, the first gain $L_s\omega_c$ is decided according to an inductance component $L_s$ of the plant 110 and a cut-off frequency $\omega_c$. The first calculating portion 520 performs subtraction with respect to the current error $i_{error}$. At this time, the first calculating portion 520 performs subtraction with respect to the current error $i_{error}$ by using an output of the second calculating portion 530. The first integrating portion 540 integrates the output of the first calculating portion 520. The second integrating portion 550 integrates an output of the first integrating portion 540. The second calculating portion 530 performs subtraction with respect to an output of the second integrating portion 550 by using a control frequency $\omega_{ac}$ of a current command. The second applying portion 560 applies a second gain $R_s\omega_c$ to the output of the first integrating portion 540. At this time, the second gain $R_s\omega_c$ is decided according to the loss resistance component $R_s$ of the plant 110 and the cut-off frequency $\omega_c$. The third calculating portion 570 performs subtraction with respect to the output of the first applying portion 510 using the output of the second applying portion 560.

According to the first embodiment, the transfer function application unit 502 outputs an output voltage $V_c$ by applying a first transfer function $C(s)$ as shown in the following [Equation 2] to the current error $i_{error}$ In [Equation 2], a first gain corresponds to a first term of the first transfer function $C(s)$, and a second gain corresponds to a second term of the first transfer function $C(s)$. By substituting [Equation 2] into [Equation 1], [Equation 3] below is obtained. At this time, when the value of $L_s\omega_c$ is sufficiently greater than $R_s$ ($L\omega_c \gg R_s$), [Equation 3] is simplified to the following [Equation 4]. [Equation 4] expresses a characteristic of a primary low-pass filter having a cut-off frequency $\omega_c$. According to [Equation 4], the current control apparatus operates like the primary low-pass filter having the cut-off frequency $\omega_c$.

$$C(s) = L_s\omega_c + \frac{R_s\omega_c s}{s^2 + \omega_{ac}^2} \quad \text{[Equation 2]}$$

$$\frac{i(s)}{i^*(s)} = \frac{\omega_c(L_s s^2 + R_s s + L_s\omega_{ac}^2)}{(s+\omega_c)(L_s s^2 + R_s s + L_s\omega_{ac}^2) + R_s\omega_{ac}^2} \quad \text{[Equation 3]}$$

$$\frac{i(s)}{i^*(s)} = \frac{\omega_c(L_s s^2 + R_s s + L_s\omega_{ac}^2)}{(s+\omega_c)(L_s s^2 + R_s s + L_s\omega_{ac}^2) + R_s\omega_{ac}^2} \approx \frac{\omega_c}{s+\omega_c} \quad \text{[Equation 4]}$$

Therefore, when a magnitude of the current command is A (that is, i*(s)=A sin $\omega_{ac}$t), an output current controlled by using [Equation 4] is expressed within a time domain, and thus the following [Equation 5] may be obtained. In [Equation 5], a first term on a right side of i(t) is eliminated when a sufficient time elapses, and a second term on the right side of i(t) decides a steady-state value.

According to the first embodiment, the steady-state value becomes the same as A sin $\omega_{ac}$t corresponding to the magnitude of the current command when a condition of $\omega_c \gg \omega_{ac}$ is satisfied. In other words, the current control apparatus operates normally when the cut-off frequency $\omega_c$ can be designed to be sufficiently greater than the control frequency $\omega_{ac}$. For example, if a grid-connected inverter controls components of 300 Hz or 420 Hz to eliminate harmonic effects of a grid power source, the cut-off frequency should be set to several kHz.

$$i(s) = \frac{\omega_c}{s+\omega_c} \frac{A\omega_{ac}}{s^2+\omega_{ac}^2} = \frac{A\omega_{ac}}{\omega_{ac}^2+\omega_c^2}\frac{\omega_c}{s+\omega_c} - \frac{A\omega_{ac}\omega_c}{\omega_{ac}^2+\omega_c^2}\frac{s}{s^2+\omega_{ac}^2} +$$
$$\frac{A\omega_c^2}{\omega_{ac}^2+\omega_c^2}\frac{\omega_{ac}}{s^2+\omega_{ac}^2} \Rightarrow i(t) =$$
$$\frac{A\omega_{ac}}{\omega_{ac}^2+\omega_c^2}e^{-\omega_c t} - \frac{\omega_{ac}\omega_c}{\omega_{ac}^2+\omega_c^2}A\cos\omega_{ac}t +$$
$$\frac{\omega_c^2}{\omega_{ac}^2+\omega_c^2}A\sin\omega_{ac}t = \frac{A\omega_{ac}}{\omega_{ac}^2+\omega_c^2}e^{-\omega_c t} +$$
$$A\sqrt{\frac{\omega_c^2}{\omega_{ac}^2+\omega_c^2}}\sin(\omega_{ac}t-\phi),\ \phi=\tan^{-1}\left(-\frac{\omega_{ac}}{\omega_c}\right)$$
[Equation 5]

However, since the cut-off frequency $\omega_c$ is generally limited to a value smaller than a switching frequency of the inverter 100, there are a lot of limitations in such a harmonic control performance in a system operating at a switching frequency of 5 kHz or less.

Figure 6:
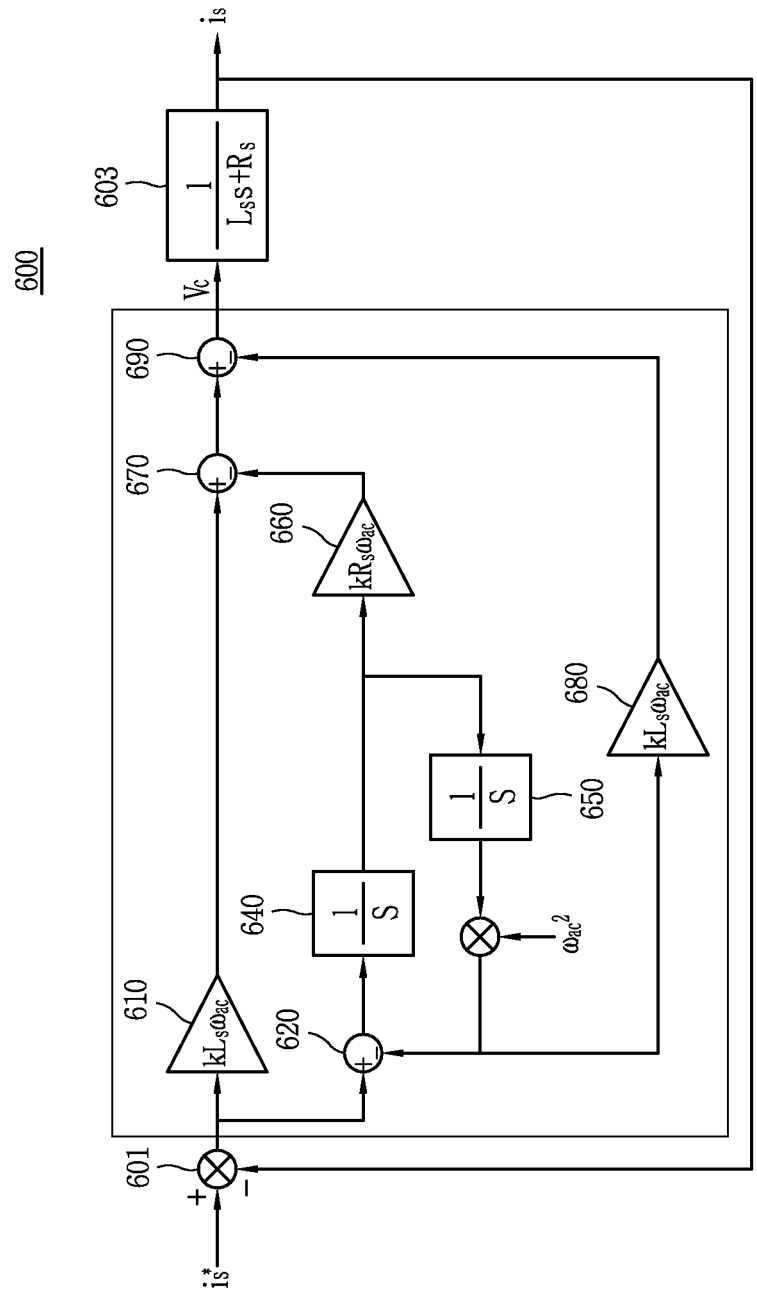
FIG. 6 is a configuration view of a current control apparatus in accordance with a second embodiment.

FIG. 6 is a configuration view of a current control apparatus in accordance with a second embodiment.

Referring to FIG. 6, a current control apparatus 600 according to a second embodiment includes a comparison unit 601, a transfer function application unit 602, and a calculation unit 603. The comparison unit 601 outputs a current error $i_{error}$ between a current command $i_s$* and an output current $i_s$ of the plant 110. The transfer function application unit 602 outputs an output voltage $V_c$ by applying a first transfer function of a feedback component into the current error $i_{error}$. The calculation unit 603 outputs an output current $i_s$ by applying a second transfer function to the output voltage $V_c$. The second transfer function is decided based on an inductance component $L_s$ of the plant 110 and a loss resistance component $R_s$ of the plant 110.

At this time, the current control apparatus 600 operates like a secondary band-pass filter, which uses a control frequency $\omega_{ac}$ of the current command as a center frequency, and a variable k represents a quality factor of the band-pass filter. According to the second embodiment, the transfer function application unit 602 may apply the variable k and a gain, which includes the control frequency $\omega_{ac}$ of the current command to the current error $i_{error}$.

The transfer function application unit 602 includes a first applying portion 610, a first calculating portion 620, a second calculating portion 630, a first integrating portion 640, a second integrating portion 650, a second applying portion 660, a third calculating portion 670, a third applying portion 680, and a fourth calculating portion 690.

The first applying portion 610 applies a first gain $kL_s\omega_{ac}$ to the current error $i_{error}$. At this time, the first gain $kL_s\omega_{ac}$ is decided according to a variable k, the inductance component $L_s$ of the plant 110, and the control frequency $\omega_{ac}$ of the current command. The first calculating portion 620 performs subtraction with respect to the current error $i_{error}$. At this time, the first calculating portion 620 performs subtraction with respect to the current error $i_{error}$ by using an output of the second calculating portion 630. The first integrating portion 640 integrates the output of the first calculating portion 620. The second integrating portion 650 integrates an output of the first integrating portion 640. The second calculating portion 630 performs multiplication with respect to an output of the second integrating portion 650 by using the control frequency $\omega_{ac}$ of the current command. The second applying portion 660 applies a second gain $kR_s\omega_{ac}$ to the output of the first integrating portion 640. At this time, the second gain $kR_s\omega_{ac}$ is decided according to the variable k, the loss resistance component $R_s$ of the plant 110, and the control frequency $\omega_{ac}$ of the current command. The third calculating portion 670 performs subtraction with respect to an output of the first applying portion 610 using an output of the second applying portion 660. The third applying portion 680 applies a third gain $kL_s\omega_{ac}$ to the output of the second calculating portion 630. At this time, the third gain $kL_s\omega_{ac}$ is decided based on the variable k, the inductance component $L_s$ of the plant 110 and the control frequency $\omega_{ac}$ of the current command. The fourth calculating portion 690 performs subtraction with respect to the output of the third calculating portion 670 using the output of the third applying portion 680. In this way, the fourth calculating portion 690 outputs an output voltage $V_c$.

According to the second embodiment, the transfer function application unit 602 outputs the output voltage $V_c$ by applying the first transfer function C(s) as shown in the following [Equation 6] to the current error $i_{error}$. In [Equation 6], the first gain corresponds to a first term of the first transfer function C(s), the second gain corresponds to a second term of the first transfer function C(s), and the third gain corresponds to a third term of the first transfer function C(s). By substituting [Equation 6] into [Equation 1], the following [Equation 7] is obtained. [Equation 7] represents a characteristic of a secondary band-pass filter having the control frequency of the current command as the center frequency $\omega_{ac}$ and the variable k represents a quality factor of the band-pass filter. According to [Equation 7], the current control apparatus 600 operates like the secondary band-pass filter having the control frequency $\omega_{ac}$ of the current command as the center frequency.

$$C(s) = k\omega_{ac}L_s + \frac{k\omega_{ac}R_s}{s^2+\omega_{ac}^2}s - \frac{kL_s\omega_{ac}^3}{s^2+\omega_{ac}^2}$$
[Equation 6]

$$\frac{i(s)}{i^*(s)} = \frac{k\omega_{ac}s}{s^2+k\omega_{ac}s+\omega_{ac}^2}$$
[Equation 7]

Therefore, when a magnitude of the current command is A (that is, i*(s)=A sin $\omega_{ac}$t), the output current controlled by using [Equation 7] is expressed in a time domain as expressed by [Equation 8] below. In [Equation 8], a first term of a right side of i(t) is eliminated when a sufficient time elapses, and a second term of the right side of i(t) decides a steady-state value. According to the second embodiment, the steady-state value is not affected by the variable factor, and always has the same magnitude as that of the current command. That is, according to the first embodiment, the steady-state value becomes equal to A sin $\omega_{ac}t$ corresponding to the magnitude of the current command when a condition of $\omega_c \gg \omega_{ac}$ is satisfied. On the other hand, according to the second embodiment, a feed-forward state value becomes equal to the current command without any condition.

$$i(s) = \frac{k\omega_{ac}s}{s^2 + k\omega_{ac}s + \omega_{ac}^2} \frac{A\omega_{ac}}{s^2 + \omega_{ac}^2} = \frac{A\omega_{ac}}{s^2 + \omega_{ac}^2} - \quad \text{[Equation 8]}$$

$$\frac{A}{\sqrt{1 - \frac{k^2}{4}}} \frac{\omega_{ac}\sqrt{1 - \frac{k^2}{4}}}{\left(s + \frac{k\omega_{ac}}{2}\right)^2 + \omega_{ac}^2\left(1 - \frac{k^2}{4}\right)} \Rightarrow i(t) =$$

$$-\frac{A}{\sqrt{1 - \frac{k^2}{4}}} e^{-\frac{k\omega_{ac}}{2}t} \sin\left(\omega_{ac}\sqrt{1 - \frac{k^2}{4}}\, t\right) + A\sin\omega_{ac}t$$

Figure 7A:
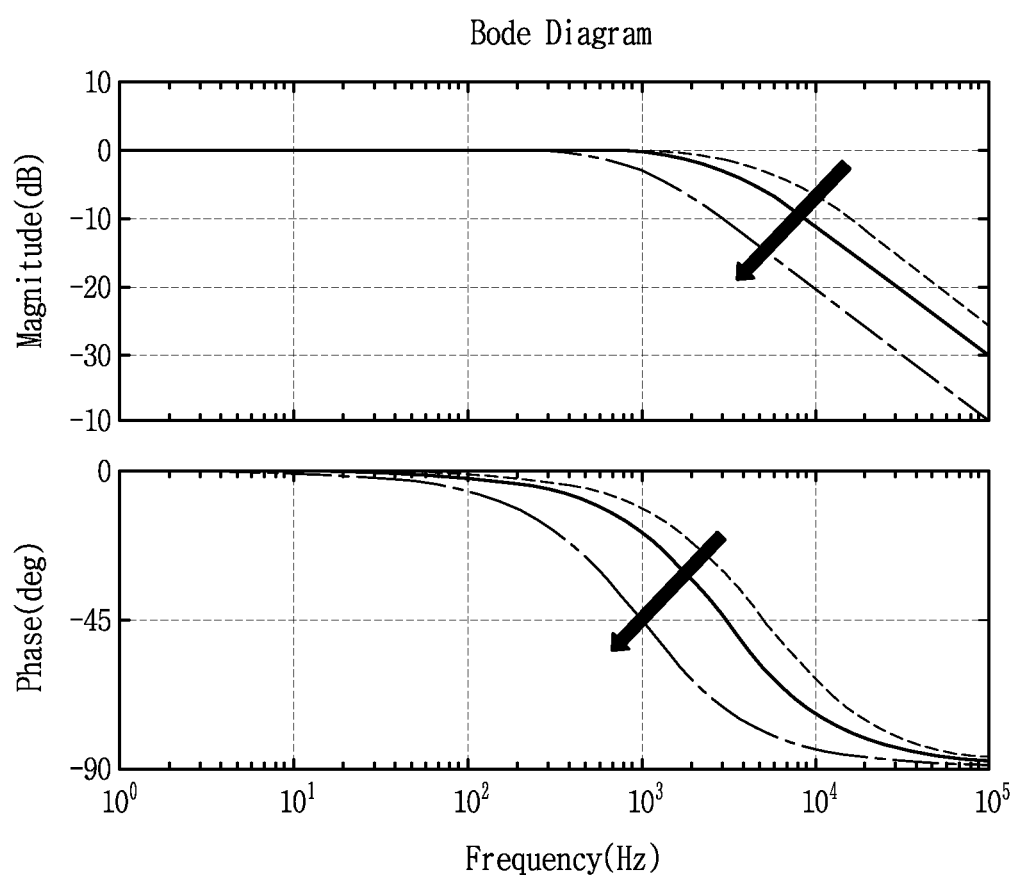
FIG. 7A is an exemplary view illustrating a response characteristic of the current control apparatus in accordance with the first embodiment.
Figure 7B:
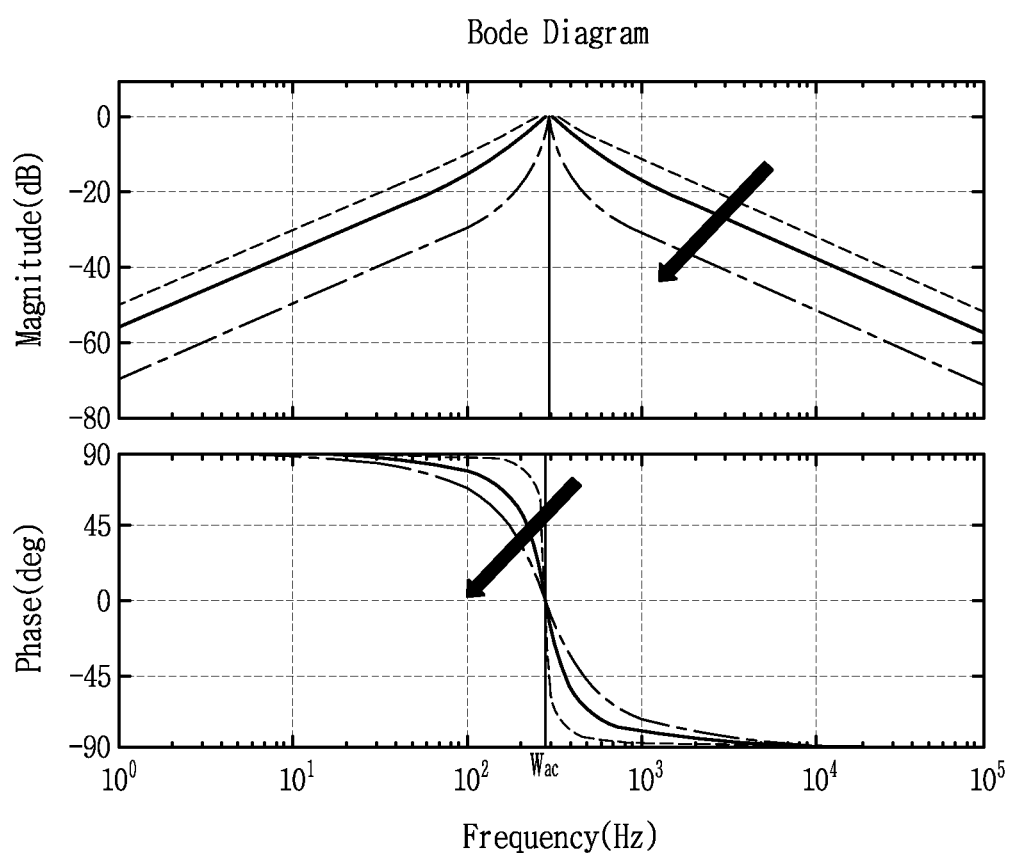
FIG. 7B is an exemplary view illustrating a response characteristic of the current control apparatus in accordance with the second embodiment.

FIG. 7A is an exemplary view illustrating a response characteristic of the current control apparatus according to the first embodiment, and FIG. 7B is an exemplary view illustrating a response characteristic of the current control apparatus according to the second embodiment.

FIG. 7A illustrates a bode diagram for [Equation 4], where an arrow direction indicates a direction in which the cut-off frequency $\omega_c$ is lowered. Due to the characteristic of the primary low-pass filter, the cut-off frequency $\omega_c$ cannot be designed sufficiently large. As a result, a controllable harmonic region decreases as the cut-off frequency $\omega_c$ is lowered (i.e., toward the arrow direction).

On the other hand, FIG. 7B illustrates a bode diagram for [Equation 7], where an arrow direction indicates a direction in which the variable k decreases. Due to the characteristic of the secondary band-pass filter, the gain is 1 at the control frequency $\omega_c$, irrespective of the variable k, and thus a steady-state performance is improved.

According to the second embodiment, as the current control apparatus operates like the secondary band-pass filter, the steady-state error is eliminated at the control frequency irrespective of the control variable. Therefore, even in a system having a low switching frequency, the harmonic current control performance can be effectively secured. Therefore, the harmonic control performance such as harmonic compensation or dead time compensation can be improved in an inverter system.

According to various embodiments, an apparatus 600 for controlling an output current provided from an inverter 100 to a plant 110 according to a current command and a method thereof are provided.

According to various embodiments, a current control apparatus 600 may include a comparison unit 601 for deciding a current error between a current command and an output current, a transfer function application unit 602 for outputting an output voltage by applying a gain including a control frequency of the current command to the current error, and a calculation unit 603 for outputting an output current from the output voltage.

According to various embodiments, the current control apparatus 600 may operate like a secondary band-pass filter having a control frequency as a center frequency, so as to output the output current with the same magnitude as that of the current command in a steady state.

According to various embodiments, the transfer function application unit 602 may output the output voltage by applying a first transfer function, which is decided based on a variable indicating a quality factor of the band-pass filter, a control frequency, an inductance component of the plant 110 and a loss resistance component of the plant 110, to the current error.

According to various embodiments, the first transfer function may be decided by the following [Equation 9].

$$C(s) = k\omega_{ac}L_s + \frac{k\omega_{ac}R_s}{s^2 + \omega_{ac}^2}s - \frac{kL_s\omega_{ac}^3}{s^2 + \omega_{ac}^2} \quad \text{[Equation 9]}$$

(where k is the variable, $\omega_{ac}$ is the control frequency, $L_s$ is the inductance component, and $R_s$ is the loss resistance component.)

According to various embodiments, the transfer function application unit 602 may include a first applying portion 610 that applies a first gain to the current error, which is decided based on the variable, the control frequency, and the inductance component of the plant 110.

According to various embodiments, the transfer function application unit 602 may further include a first calculating portion 620 for performing subtraction with respect to the current error, a first integrating portion 640 for integrating an output of the first calculating portion 620, and a second integrating portion 660 for applying a second gain, which is decided based on the variable, the control frequency and the loss resistance component of the plant 110, to an output of the first integrating portion 640.

According to various embodiments, the transfer function application unit 602 may further include a second integrating portion 650 for integrating the output of the first integrating portion 640, a second calculating portion 630 for performing multiplication with respect to an output of the second integrating portion 650, and a third applying portion 680 for applying a third gain, which is decided based on the variable, the control frequency, and the inductance component of the plant 110, to an output of the second calculating portion 630.

According to various embodiments, the first calculating portion 620 may perform subtraction with respect to the current error using the output of the second integrating portion 650.

According to various embodiments, the transfer function application unit 602 may further include a third calculating portion 670 for performing subtraction with respect to the output of the first applying portion 610 using the output of the second applying portion 660, and a fourth calculating portion 690 for performing subtraction with respect to an output of the third calculating portion 670 using the output of the third calculating portion 680 so as to output an output voltage.

According to various embodiments, the calculation unit 603 may output an output current by applying a second transfer function, which is decided based on an inductance component and a loss resistance component of the plant 110, to the output voltage.

According to various embodiments, a method of operating the current control apparatus 600 may include deciding a current error between a current command and an output current, outputting an output voltage by applying a gain including a control frequency of the current command to the current error, and outputting an output current from the output voltage.

The foregoing embodiments according to the present invention are merely illustrative, and it will be understood by those skilled in the art that various changes and modifications can be made without departing from the spirit and scope of the invention as defined by the appended claims. Therefore, the technical scope of the present invention should be determined by the following claims.

What is claimed is:

1. An apparatus for controlling an output current provided from an inverter to a plant according to a current command, the apparatus comprising:
   a comparison unit to decide a current error between the current command and the output current;
   a transfer function application unit to output an output voltage by applying a gain including a control frequency of the current command to the current error; and
   a calculation unit to output the output current based on the output voltage,
   wherein the calculation unit operates like a secondary band-pass filter having the control frequency as a center frequency so as to output the output current with the same magnitude as the current command in a steady state, and
   wherein the transfer function application unit outputs the output voltage by applying a first transfer function to the current error, the first transfer function being selected based on a variable indicating a quality factor of the band-pass filter, the control frequency, an inductance component of the plant, and a loss resistance component of the plant.

2. The apparatus of claim 1, wherein the first transfer function is decided by the following equation, $$C(s) = k\omega_{ac}L_s + \frac{k\omega_{ac}R_s}{s^2 + \omega_{ac}^2}s - \frac{kL_s\omega_{ac}^3}{s^2 + \omega_{ac}^2}$$

(where k is the variable, $\omega_{ac}$ is the control frequency, $L_s$ is an inductance component, and $R_s$ is a loss resistance component.

3. The apparatus of claim 1, wherein the transfer function application unit comprises a first applying portion to apply a first gain to the current error, the first gain being decided based on the variable, the control frequency and the inductance component of the plant.

4. The apparatus of claim 3, wherein the transfer function application unit further comprises:
   a first calculating portion to perform subtraction with respect to the current error;
   a first integrating portion to integrate an output of the first calculating portion; and
   a second applying portion to apply a second gain to an output of the first integrating portion, the second gain being decided based on the variable, the control frequency and the loss resistance component of the plant.

5. The apparatus of claim 4, wherein the transfer function application unit comprises:
   a second integrating portion to integrate the output of the first integrating portion;
   a second calculating portion to perform multiplication with respect to an output of the second integrating portion using the control frequency; and
   a third applying portion to apply a third gain to an output of the second calculating portion, the third gain being decided based on the variable, the control frequency and the inductance component of the plant.

6. The apparatus of claim 5, wherein the first calculating portion performs subtraction with respect to the current error using the output of the second integrating portion.

7. The apparatus of claim 5, wherein the transfer function application unit further comprises:
   a third calculating portion to perform subtraction with respect to the output of the first applying portion using the output of the second applying portion; and
   a fourth calculating portion to perform subtraction with respect to an output of the third calculating portion using an output of the third applying portion so as to output the output voltage.

8. The apparatus of claim 1, wherein the calculation unit outputs the output current by applying a second transfer function to the output voltage, the second transfer function being decided based on the inductance component of the plant and the loss resistance component of the plant.

9. A method for controlling an output current provided from an inverter to a plant according to a current command, the method comprising:
   deciding a current error between the current command and the output current;
   outputting an output voltage by applying a gain including a control frequency of the current command to the current error; and
   outputting the output current based on the output voltage,
   wherein outputting the output current based on the output voltage further comprises outputting the output current with the same magnitude as the current command in a steady state through a secondary band-pass filter having the control frequency as a center frequency, and
   wherein the outputting the output voltage further comprises outputting the output voltage by applying a first transfer function to the current error, the first transfer function being decided based on a variable indicating a quality factor of the secondary band-pass filter, the control frequency, an inductance component of the plant, and a loss resistance component of the plant.

* * * * *